No. 869,246. PATENTED OCT. 29, 1907.
C. S. JONES.
MEASURING PUMP.
APPLICATION FILED MAY 31, 1907.
2 SHEETS—SHEET 1.
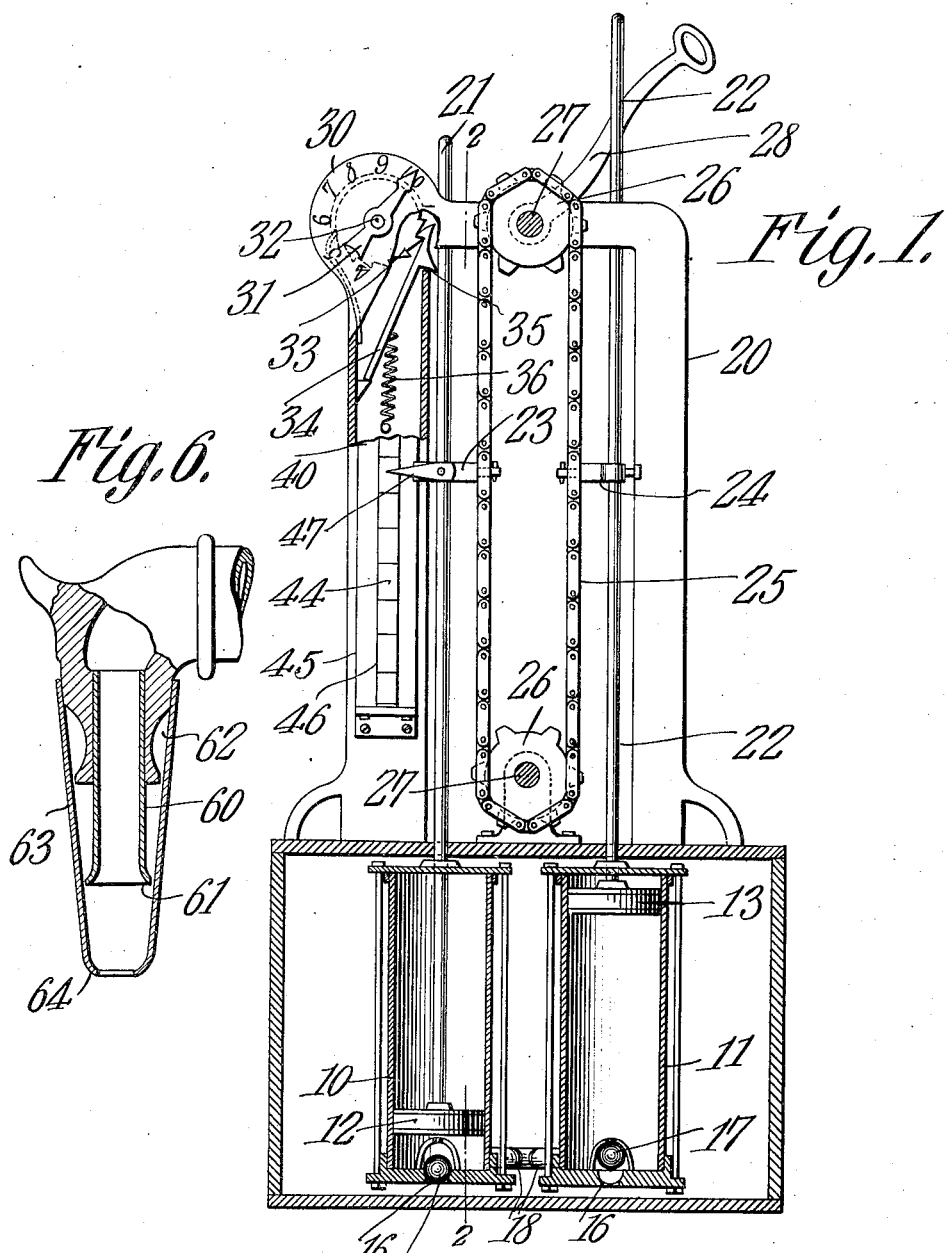
Charles S. Jones, INVENTOR.

No. 869,246.
PATENTED OCT. 29, 1907.
C. S. JONES.
MEASURING PUMP.
APPLICATION FILED MAY 31, 1907.
2 SHEETS—SHEET 2.
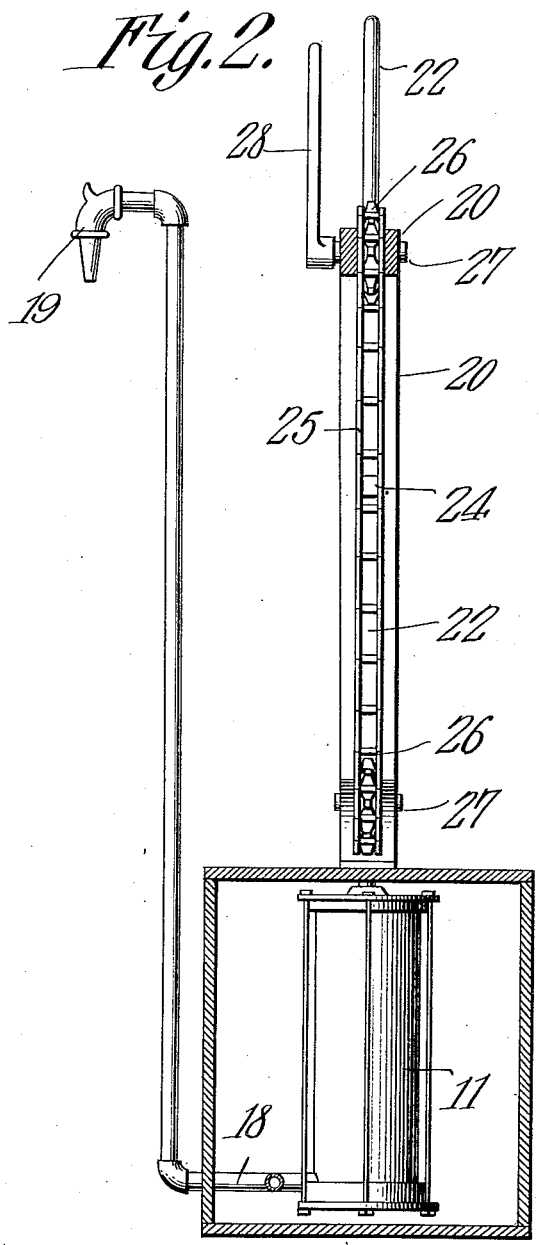
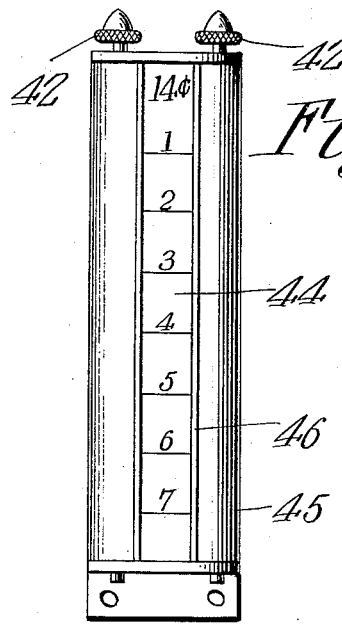
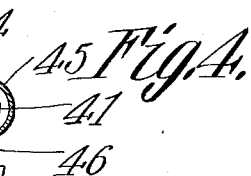
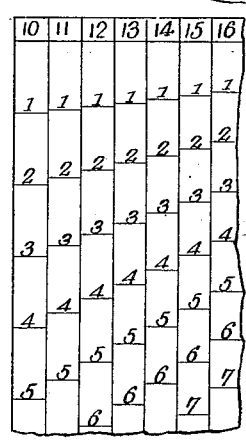
WITNESSES:
Charles S. Jones, INVENTOR.
By C. A. Snow & Co.
ATTORNEYS

UNITED STATES PATENT OFFICE.

CHARLES S. JONES, OF MARION, INDIANA.

MEASURING-PUMP.

No. 869,246.    Specification of Letters Patent.    Patented Oct. 29, 1907.

Application filed May 31, 1907. Serial No. 376,538.

*To all whom it may concern:*

Be it known that I, CHARLES S. JONES, a citizen of the United States, residing at Marion, in the county of Grant and State of Indiana, have invented a new and useful Measuring-Pump, of which the following is a specification.

This invention relates to measuring pumps, and has for one of its objects to provide a device of simple construction by which any desired quantity of liquid may be delivered from a tank or other receptacle in a continuous uninterrupted stream, and in which the quantity so delivered will be accurately measured, and its cost computed and indicated.

A further object of the invention is to provide a computing device in the form of a series of tables which may be readily adjusted into operative relation, or to exposed position to co-act with a movable member of the pumping mechanism for the purpose of indicating the cost of the quantity of fluid delivered.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of a measuring pump constructed in accordance with the invention. Fig. 2 is a transverse sectional view of the same on the line 2—2 of Fig. 1. Fig. 3 is a front elevation of the computing device. Fig. 4 is a sectional plan view of the same. Fig. 5 is a detail view of the computing table. Fig. 6 is a detail sectional view of the delivery nozzle.

Similar numerals of reference are employed to indicate corresponding parts throughout the several figures of the drawings.

In carrying out the present invention, a pair of pumping cylinders 10—11 are arranged in a tank or other receptacle, and in these cylinders are pistons 12 and 13. In the lower end of each cylinder is an inlet port 16, normally closed by a valve 17 which is opened on the up stroke of the piston for the purpose of admitting liquid to the cylinder. On the down stroke of the piston the valve is closed, and the liquid is expelled through a pipe 18, the pipes from both cylinders leading to a common discharge nozzle 19 through which a continuous stream of liquid is discharged, so long as the pump is kept in operation.

The operating mechanism for the pump is mounted in a suitable frame 20 which has bearings for a pair of piston rods 21 and 22, and these are connected by blocks 23—24 of an endless link belt 25; the connections with the rods and with the belt being adjustable. The link belt 25 passes over a pair of sprocket wheels 26, the upper of said sprocket wheels being carried by a shaft 27 to which is secured a handled crank 28 which may be manually operated first in one direction and then in the other direction for the purpose of alternately operating the pumps, and as one of the piston is always descending, the stream of liquid discharged is continuous and uninterrupted.

In order to indicate the number of full strokes of the pump and the quantity of liquid delivered, an indicating dial 30 is employed, said dial being provided with suitably marked graduations over which travels a pointer 31 carried by a shaft 32. On the shaft is a ratchet wheel 33 with which engages a pawl 34 having a shoulder 35 disposed in the path of movement of the block 23, and each time the block 23 is elevated to the fullest extent it will engage with the projecting shoulder of the pawl and will raise the latter for the purpose of causing its engagement with the other tooth of the ratchet. When the block moves downward, the pawl is retracted by a spring 36, so that the ratchet wheel will be advanced to the extent of a single tooth, and the pointer will be moved to a corresponding extent, thus indicating the number of complete strokes of the piston, and the number of times the cylinders are emptied, so that the quantity of liquid discharged may be readily indicated.

At one side of the standard are arranged projecting brackets in which are journaled the upper and lower ends of a pair of rollers 40—41, the upper ends of which are provided with milled knobs 42, so that they may be conveniently turned. These rollers carry a computing strip 44 on which is marked a series of vertical tables each based on different values, that is to say, taking one gallon or one quart as a unit of liquid measurement, the tables will be based at a certain price per gallon, and each table is different from the other, so that the table bearing the current market rate may be readily exposed to view while the others are concealed. The rollers are arranged within a suitable casing 45, and said casing is provided with a vertical slot 46 of a width sufficient to expose but one of the tables, so that the others may be concealed in order to prevent confusion.

Secured to the piston rod block 23 is a pointer 47 that is arranged to project over the slot 46, so that it may coöperate with any of the tables exposed at the slot for the purpose of computing the value of the liquid delivered, that is to say, if one gallon of liquid is delivered, the piston rod will move a predetermined distance, and this distance measured by the pointer 47 on the table 44 will indicate on the table the value of the liquid.

With a device constructed in accordance with this invention, the quantity and the value of the liquid discharged may be readily indicated without the necessity of mental calculation.

In order to prevent dripping at the spout or nozzle 19, the spout carries a downwardly extending tube 60 having an outwardly flared lower edge 61, and the periphery of the spout is concaved as indicated at 62. Over the tube and the spout fit the nozzle proper in the form of a tapered tube 63, the lower end of which is provided with an inturned flange 64. The nozzle member forms in connection with the spout and the tube 60 a pair of annular chambers, in both of which a partial vacuum is created by the downward rush of the liquid, and when the current ceases the influx of air at the discharge end of the nozzle to refill the vacuum spaces will cause the liquid to flow upward and cling in the form of a film to the interior of the nozzle, so that dripping will be prevented.

I claim:—

1. In a measuring pump, the combination with a pair of pumping devices including piston rods, of a common discharge to which the pumping devices are connected, a sprocket chain, means for operating the same, connecting blocks between the opposite runs of the sprocket chain, and the piston rods, and an indicating device having an operating member arranged in the path of movement of one of said blocks.

2. In a measuring pump, a pair of pumping devices including piston rods, a sprocket chain, the opposite runs of which are connected to said piston rods, a block projecting from said sprocket chain, means for operating the sprocket chain, an indicating device including a ratchet wheel, and a pawl engaging said ratchet wheel, said pawl being disposed in the path of movement of said block.

3. In a measuring pump, a pair of pumping cylinders, a discharge pipe to which both cylinders are connected, pistons arranged in the cylinders, piston rods connected to the pistons, a frame, a pair of sprocket wheels, and sprocket wheel shafts supported by the frame, an endless link belt passing over the sprocket wheels, blocks connecting the opposite runs of the belt to the piston rods, an operating crank on one of the shafts, an indicator including a ratchet wheel, a pawl for operating said ratchet wheel, said pawl having a roller disposed in the path of movement of one of the blocks, and a spring for retracting the pawl.

In testimony that I claim the foregoing as my own, I have hereto affixed my signature in the presence of two witnesses.

CHARLES S. JONES.

Witnesses:
CHRIS DREITFER,
MORTON KEITH.